Feb. 4, 1936.  G. W. WALTON  2,029,401
METHOD OF AND APPARATUS FOR OBTAINING OPTICAL EFFECTS BY ELECTRICAL MEANS
Filed Jan. 14, 1932   5 Sheets-Sheet 1

Feb. 4, 1936.   G. W. WALTON   2,029,401
METHOD OF AND APPARATUS FOR OBTAINING OPTICAL EFFECTS BY ELECTRICAL MEANS
Filed Jan. 14, 1932   5 Sheets-Sheet 4

Inventor
George W. Walton
By Cushman, Byrant, Derby & Cushman
Attys

Feb. 4, 1936. G. W. WALTON 2,029,401
METHOD OF AND APPARATUS FOR OBTAINING OPTICAL EFFECTS BY ELECTRICAL MEANS
Filed Jan. 14, 1932 5 Sheets-Sheet 5

Inventor
George W. Walton

Patented Feb. 4, 1936

2,029,401

UNITED STATES PATENT OFFICE 2,029,401

METHOD OF AND APPARATUS FOR OBTAINING OPTICAL EFFECTS BY ELECTRICAL MEANS

George William Walton, London, England

Application January 14, 1932, Serial No. 586,664
In Great Britain January 19, 1931

16 Claims. (Cl. 88—61)

The present invention relates to electrical methods of and means for producing optical effects upon light.

One object of the invention is to provide a method and means for producing electrically an optical effect upon light equivalent to that of a lens, prism or the like. A further object of the invention is to provide a method and means of electrically controlling the intensity of a beam of light, without of necessity using polarized light.

It is to be understood however that polarized light may be used if found desirable.

Hitherto light intensity has been controlled by mechanical apparatus, such as oscillating mirrors with apertures and the like, by electrical gas discharge tubes such as neon lamps, and by using the Faraday or Kerr effects with plane polarized light, all of which have inherent disadvantages. For instance, the mechanical devices and the electric gas discharge tube are not sufficiently rapid in their response, and the Faraday and Kerr effects require the use of polarizing prisms, which besides being costly, are usually of very small aperture so that the light which can be passed is very limited, and moreover considerable heating takes place in the control devices themselves, more particularly in the Kerr cells, which renders the performance irregular.

The invention is based on the following properties of a refracting medium. Every gaseous, liquid, or solid medium through which light passes, has a particular refractive index, and when a ray of light passes from one medium to another medium of a different refractive index, the ray of light is deflected from its original path when it strikes the boundary surface at an angle, other than 90°. The deflection follows the law, that the sine of the angle the emergent ray makes with the normal at the boundary surface, at the point of emergence, is equal to the sine of the angle the incident ray makes with that normal, multiplied by the refractive index, when passing from a medium of a higher to one of a lower index, and divided by the refractive index, when passing from a medium of a lower into another of a higher index. Every medium has a particular speed of light propagation through it, and this speed is proportional to the reciprocal of the refractive index. It is therefore, possible to regard refraction purely from the point of view of the propagation speeds of the mediums, instead of with respect to the sines of the incident and emergent angles. Again, the refractive index of a medium has a definite relation to the dielectric properties of that medium, the specific inductive capacity of a transparent dielectric being equal to the square of the refractive index.

The refractive index of a vacuum is 1, and it has been found that it is modified when there is an electric discharge in the vacuum. It has also been found that the refractive index of any dielectric is modified when submitted to electrical influences.

The properties above referred to are made use of in the present invention.

The invention will now be described, by way of example with reference to the accompanying diagrammatic drawings; in which:

Fig. 1 shows one form of vacuum device according to the invention,

Fig. 2 being a section thereof along the plane 2—2 in Fig. 1 and Fig. 3 being an explanatory diagram.

Figs. 4, 5, and 6 show modifications of Fig. 1,

Fig. 10 shows a modified form of device producing a reversed effect as compared with Fig. 1, Fig. 11 being an explanatory diagram thereof, Fig. 12 shows a type of device producing optical effects similar to those of a prism, Fig. 13 being an explanatory diagram.

Figures 1, 2, 3, 5, 6:
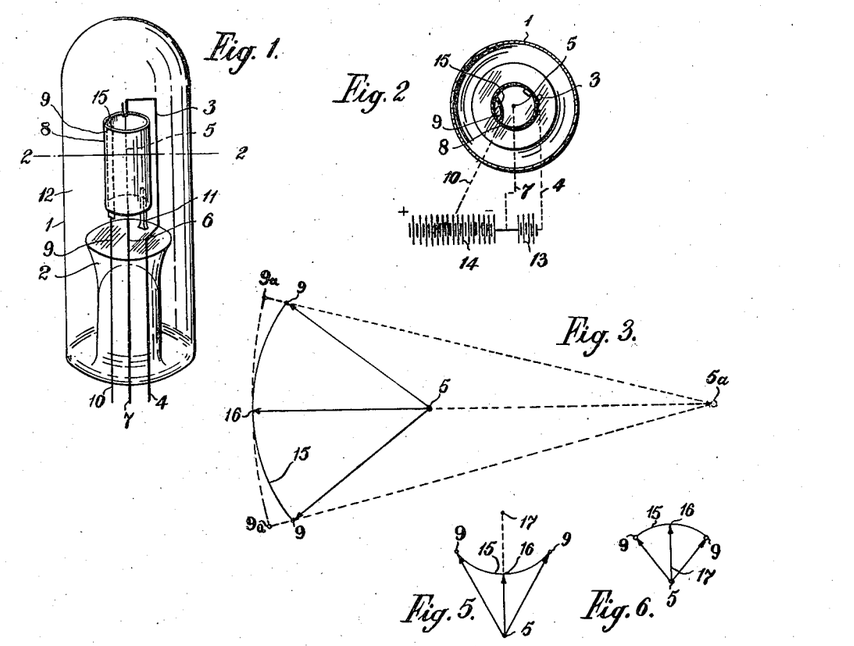

Referring to Figs. 1, 2, and 3, 1 is the envelope of a vacuum tube, 2 is a pinch in which the leads 4, 7, and 10 are sealed to the supports 3, 6, and 9 respectively, the latter being also mounted in the pinch. The support 3 supports the filament 5 which is preferably rendered brightly incandescent, as the device is used also as a source of illumination, the other end of the filament 5 being connected to the support 6. The filament 5 is surrounded by an open-ended cylinder 8 of transparent insulating material, such as glass, which is supported by the support 9 serving also as a connection, as well as by the support 11. On the interior surface of the cylinder 8 there is deposited a high resistance conducting film 15 which is semi-transparent, for instance such as sputtered platinum, the connection therewith being effected by means of the support 9 which is in the form of a loop.

The battery 13 supplies current to the filament 5 through the leads 4 and 7. The resistant film 15 on the cylinder 8 is connected to the battery 14 through the loop support 9 and lead 10, a positive potential being applied thereto relatively to the filament 5. As the film 15 constitutes an anode with respect to the filament 5, electrons will be drawn towards it from the filament, the velocity and the number of the electrons being dependent on the positive potential of the film. When a thermionic current is flowing through the device there is a potential drop in the film 15 between the two side portions of the loop 9, which, if the film is of even thickness and resistance, is such that at a point midway between the sides of the loop 9, the potential relative to the filament 5 is lowest, and gradually increases towards both sides of the loop 9 where it is highest.

The anode thus comprises a high resistant film with a relatively highly conducting region on the edges of the film.

In Fig. 3 which shows only the filament 5, the resistant film 15 and loop 9, light from the filament 5, when there is no potential on the film 15, will arrive at all points on 15 simultaneously if the centre of curvature of 15 is at 5. When a potential is applied to the film 15, owing to the potential drop along it, light will arrive at the centre point 16 thereof at a different time than at points 9, since the electrical influence causes the speed of light along 5—16 to be different from that along 5—9. The refractive index and therefore the speed of light propagation depends on the intensity of the electrical influence; consequently there is a change of wavefront of the light from 5, which, if there is an advance along 5—9 as compared with the path along 5—16, is such that the apparent position of 5 is changed to 5a, and the new wavefront is 9a—16—9a.

If the device described is included in a normal optical system, say to produce an image of the filament, it will behave as a cylindrical lens of varying focal length controlled by electrical influence without movement of any parts, and may therefore be used with great advantage for many different purposes.

Figure 4:
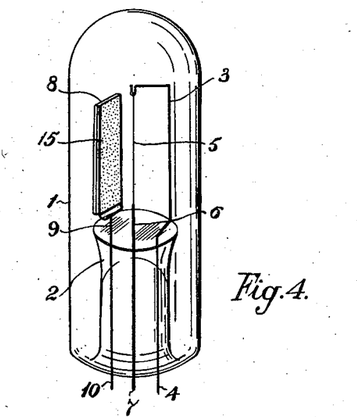

In Fig. 4, which shows a modification of the device illustrated in Fig. 1, the resistant film 15 is flat instead of cylindrical. Fig. 5 illustrates a modification in which the anode film 15 between the connecting leads 9 is convex with respect to the filament 5, its centre of curvature being at 17. Fig. 6 shows a modification in which the centre of curvature of the concave film 15 lies at 17 between the film and the filament. Generally the arrangement of Fig. 2 is the most convenient one, although in special cases the other shapes may be of advantage. In choosing the best shape for a particular purpose, the distance of a point of 15 from the filament 5 must be taken into consideration together with the potential of that point relatively to the filament.

Figure 7:
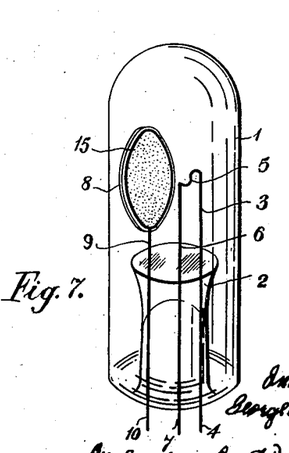
Fig. 7 shows a further modification of Fig. 1.

The devices shown in Figs. 1–6 produce an effect equivalent to that of cylindrical lenses; it is, however, possible to obtain the effect of a spherical lens. An arrangement of this type is shown in Fig. 7. The highly resistant film 15 is circular, and the connection therewith is made by the circular loop 9, so that the potential of 15 relative to the filament 5 is a minimum in the centre and greatest at the edges, near the loop 9. The filament 5 is concentrated to approximately a point source of light, though this is not essential.

Many other forms, elliptical and otherwise, may be used to obtain special optical effects and the film 15 may be curved cylindrically, spherically or spheroidally, by suitably shaping the support 8.

Figure 8:
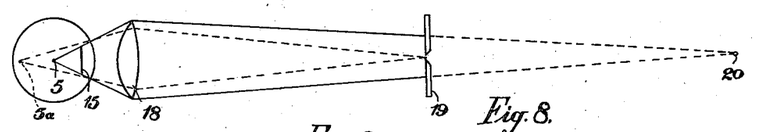
Figs. 8 and 9 show the application of the invention to the control of light intensity.

One of the principal uses of the invention is as a light control device, and a typical arrangement for this purpose is shown in Fig. 8. In this figure, 5 is the incandescent filament, which serves as the source of light as well as for the operation of the device as described above, and 15 is the highly resistant film. 18 is a normal lens, which, when no potential is applied to 15, will focus an image of the filament 5 at the point 20, the apertured member having the slit 19 however reducing the amount of light at 20 to a very low value. When potential is applied to 15 relatively to 5, the apparent or virtual image of 5 is shifted to 5a and consequently, with the application of sufficient potential, the lens 18 forms an image of 5 on the slit 19, so that all the useful light from 5 passes through the slit. As the potential on 15 is reduced, the light passing through the slit is also reduced to a minimum as above referred to.

Figure 9:
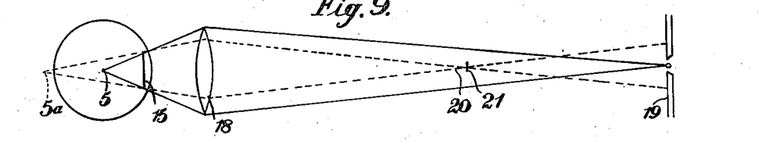

Fig. 9 shows a negatively acting arrangement in which an increase in potential reduces the light passing through the slit. An opaque stop 21 placed at the focus 20, at which the light passing through the slit 19 is a minimum, prevents any light from passing if it is of the same size as the image of 5 at 20. As the potential on the film 15 is decreased, the light passing through the slit 19 is increased. A stop may be placed in the same way at 20 in Fig. 8, so that the minimum light shall be zero.

Figures 10, 11, 12, 13:
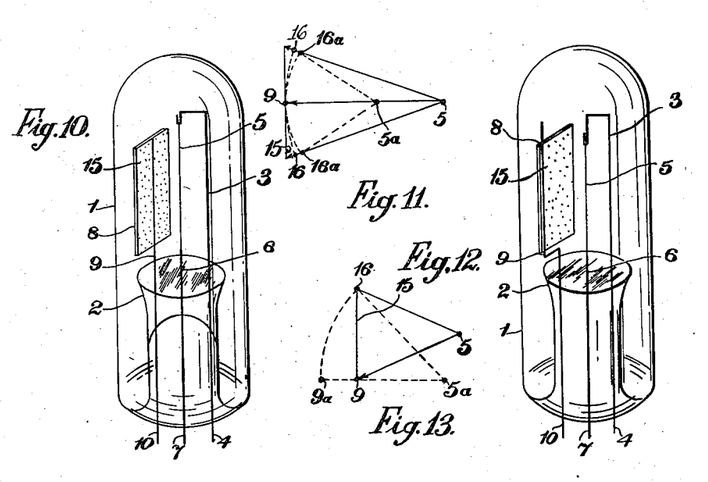

Fig. 10 shows a type of device in which the effect produced is reversed as compared with the effect produced by the arrangement of Fig. 1. For this purpose a single contact 9 is provided in the centre of the high resistant film 15. Fig. 11, which is similar to Fig. 3, shows the reversed action which is produced. The wavefront of the light from the filament 5 is cylindrical, the centre of curvature being at 5. When a potential is applied to the film 15 through the contact 9, the potential is lowest at the edges of 15 and highest at 9; consequently the speed of light along 5—9 is different from that along 5—16, which changes the wavefront so that its apparent centre of curvature is at 5a, i. e. the effect is reversed relatively to that indicated in Fig. 3. The construction according to Fig. 10 may be used in the arrangements according to Figs. 8 and 9, in each case the relation between the light passing through the slit and the applied potential being reversed to those shown in Figs. 8 and 9.

In a similar manner a reversal of the effect produced by the apparatus of Fig. 7 may be effected by arranging the highly conducting region 9 of the anode at the centre of the resistant film 15. The potential of the film 15 relative to the filament 5 is then a maximum at the centre and minimum at the edges.

All the devices so far described have a lens effect but a prism effect may also be obtained by a device of the type shown in Fig. 12, wherein connection is made to one edge of the high resistant film 15, so that the other edge is at the lowest potential relatively to the filament 5. Fig. 13 shows the effect obtained, viz. how the general travelling direction of light is changed. When a potential is applied to the contact 9 and therefore to the film 15, there is a drop of potential across the latter, which causes the speed of light along 5—9 to be different from that along 5—16. This results in a change of wavefront to 9a—16, so that the virtual image of 5 is at 5a, i. e. displaced sideways, which corresponds to the effect of a prism. The construction according to Fig. 12 may also be used in the arrangements shown in Figs. 8 and 9, an image of the filament 5 being focussed on to the slit 19, which image will be displaced sideways when a potential is applied to the film 15 relatively to the filament 5.

Figure 14:
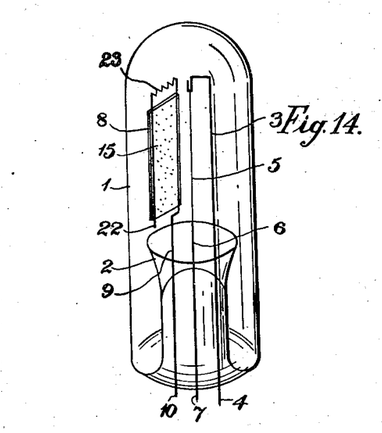
Fig. 14 shows a type of device for obtaining combined prism and lens effects, Fig. 15 being an explanatory diagram thereof.
Figure 15:
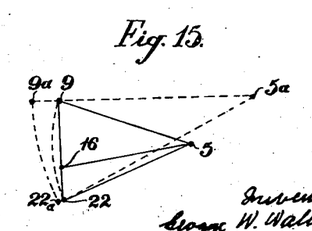

Combined prism and cylindrical lens effects may be obtained by an arrangement as shown in Fig. 14. The one edge of the film 15 is connected to the connector 9 and the other edge to the connector 22, the two connectors being connected together through a resistor 23 of smaller resistance than the film 15 between the connectors 9 and 22, so that the potentials applied to the two edges are different. In consequence thereof there is some point on 15 where the potential is lowest. Fig. 15 shows the double displacement of the virtual image 5a of the filament 5. Similar but reversed lens effects may be obtained with the device described with reference to Fig. 10 if the connector 9 is not in the centre of the film 15.

Effects similar to those above described may be obtained by using gaseous liquid and transparent or translucent solid mediums.

Figure 16:
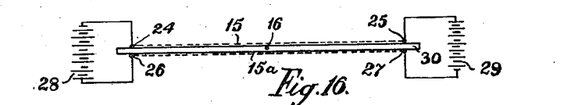
Fig. 16 shows a type of device according to the invention in which use is made of a solid medium, Figs. 17 and 18 being modifications thereof.

Fig. 16 shows an arrangement in which the medium consists of a solid dielectric 30 on the surface of which are deposited the high resistant films 15 and 15a. The connection with 15 is effected by connectors 24 and 25 and with 15a by connectors 26 and 27. A battery 28 is connected to 24 and 26 and another battery 29 to 25 and 27, in such a manner that 24 and 27 are positive and 25 and 26 negative, whereby a current is caused to pass through the resistant films 15 and 15a and a potential drop to be produced along them. As a result thereof, at the point 16, the potential difference between 15 and 15a is zero, if the batteries are of equal voltage and the resistances of the films 15 and 15a vary in the same regular manner across the surfaces of 30 and the potential difference at the edges is greatest, so that the refractive index of 30 is least at the edges and greatest at the centre. In consequence thereof light is more retarded in the centre and a cylindrical lens effect is produced when light passes through the thickness of 30. The plate 30 may be of lenticular shape and only one source of potential need be used if 24 and 27 and similarly 25 and 26 are connected together. The effect obtained with this device is similar to that obtained with the construction shown in Fig. 1.

Figure 17:
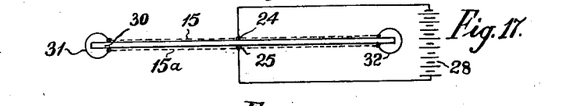

Fig. 17 shows a similar device having a reversed effect. The connection with the films 15 and 15a is made at 24 and 25 from the two poles of the battery 28, the edges of the films being connected by the connectors 31 and 32. This device produces effects similar to those obtained with the construction according to Fig. 10.

Figure 18:
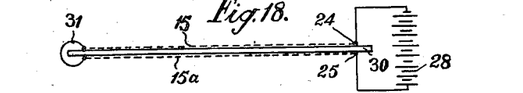

The device shown in Fig. 18 produces a prism effect such as obtained with the device according to Fig. 12 and effects such as obtained by the device according to Fig. 14 may be obtained by an arrangement such as shown in Fig. 16, if one battery is of lower voltage than the other, or by a construction such as shown in Fig. 17, if 24 and 25 are not central and one end connection has appreciable resistance.

Figures 19, 20, 21:
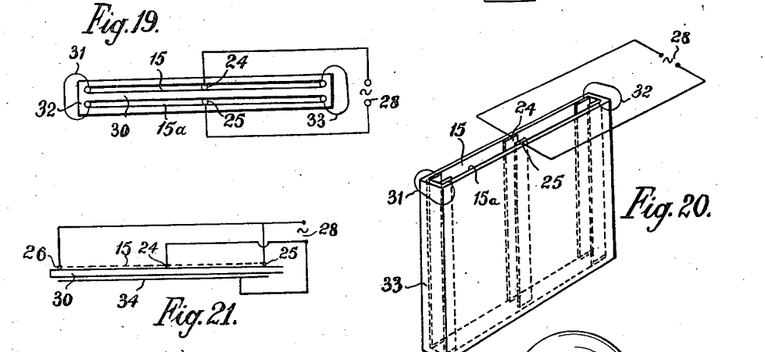
Fig. 19 shows a further modification of Fig. 16 in which use is made of electrolite or colloid resistors.
Fig. 20 shows a modification in which use is made of a fluid medium.
Fig. 21 shows a device in which only one resistant film is used.

The high resistant semi-transparent films may be replaced by transparent conducting liquids, colloids, and the like by using a suitable cell arrangement such as is shown in Fig. 19, wherein the cell 32, which is entirely of transparent material, such as glass, has a member 30 dividing it into two compartments filled with a liquid, such as water, connections being made, as in Fig. 17, with the liquid films 15 and 15a.

In all these devices use may be made of a varying potential such as alternating current from a source 28, television signals and the like.

Generally solid mediums are so rigid that differences of strain in them, to produce the effects above described, can only be obtained when the thickness is very small as compared with the length, as shown in Figs. 16 to 19. Gases, preferably under pressure, and liquids are more satisfactory and a suitable type of device using a liquid medium is shown in Fig. 20. The cell 33 is provided with the films 15 and 15a on its parallel inner surfaces, connection being made with them by means of connectors 24 and 25 respectively, and otherwise as shown in Fig. 17. The cell contains a transparent liquid dielectric, such as oil or the like. When gas is used the device must of course be sealed. Other effects such as those obtained by the devices shown in Figs. 1, 10, 12, and 14 may be obtained with devices similar to that of Fig. 20 by using suitable connections and potentials as described in connection with Figs. 16, 17, and 18.

In all the Figs. 16–20, use is made of two resistant films 15 and 15a to produce the differences of electrical influence in the medium between them, but this is not essential. Fig. 21 shows a device having only one resistant film 15, and a conductor 34 having very little or no voltage drop across it. By connecting 34 to 25 reversed effects are obtained as compared with those obtained when, as shown in Fig. 21, 34 is connected to 24. Prism effects may be obtained by having no connection between the source of potential and 34 and by applying the potential between the connectors 25 and 26 and connecting 34 to one of them. Combined prism and lens effects may be obtained by using the arrangement of Fig. 21 with a resistor connected in the lead to 25 or 26. The conductor 34 may of course be transparent such as a fluid or colloid, or it may be an opaque metallic film, light passing through 30 on to it and being reflected back through 30, but the effects will be similar, though increased, owing to the double passage through 30.

Figures 22, 24:
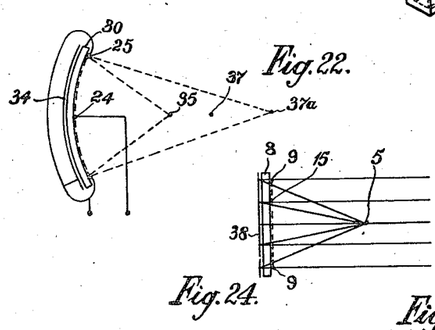
Figs. 22 and 23 show modifications of reflecting arrangements.
Fig. 24 being an explanatory diagram of Fig. 23.

When the device according to Fig. 21 is provided with a reflecting surface, it may be shaped to form a convex or concave mirror having a cylindrical, spherical or spheroidal curvature, as desired. Such an arrangement is shown in Fig. 22, in which 35 is a source of light, an image of which would be focussed by the mirror, at 37, if no potential were applied. However, when a potential is applied, the image is formed at some other point 37a, which is on the same optical axis, if the device has a plain lens effect and extra-axial, if the device has a prism effect.

All the devices shown in Figs. 16 to 20 may be used with a reflector to obtain an increased effect, by causing light to pass twice through them. The devices shown in Figs. 1, 4, 7, 10, 12, and 14 may also be made reflecting, either directly from the high resistant film 15, or by providing a suitable reflecting surface as shown in Fig. 23.

Figure 23:
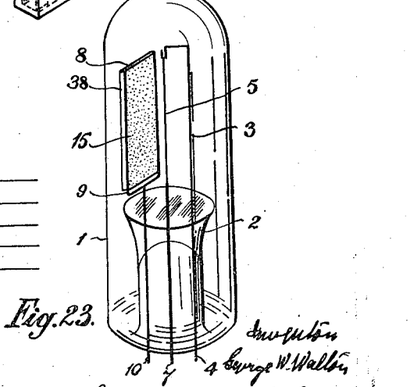

In Fig. 23 the support 8 for the resistant film 15 has a reflecting surface 38, which may be obtained by silvering the other surface of the support, so that light from the filament 5 passes through 15 and 8 and is reflected back at 38 through 8 and 15 as shown in Fig. 24. When a potential is applied to 15 relatively to 5, the apparent position of 5 changes. When use is made of electric discharge devices of the reflecting type, care must be taken that any reflected real image of 5 shall be formed outside of the device or at least further removed from 15 than is 5.

Figure 25:
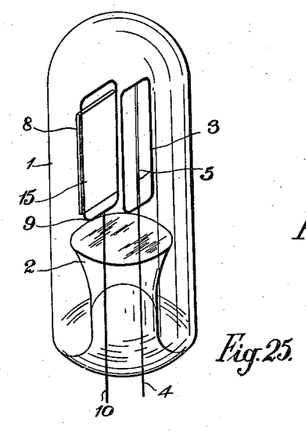
Figs. 25, 26, 27, and 28 show arrangements in which a source of light is provided outside the vessel of an electric discharge device.
Figure 26:
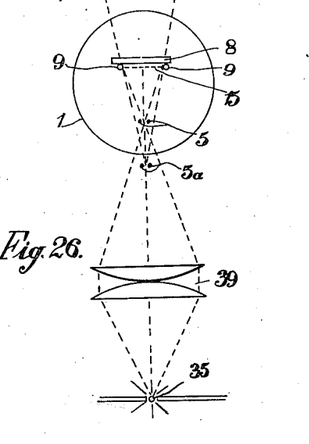
Figures 27, 28, 29:
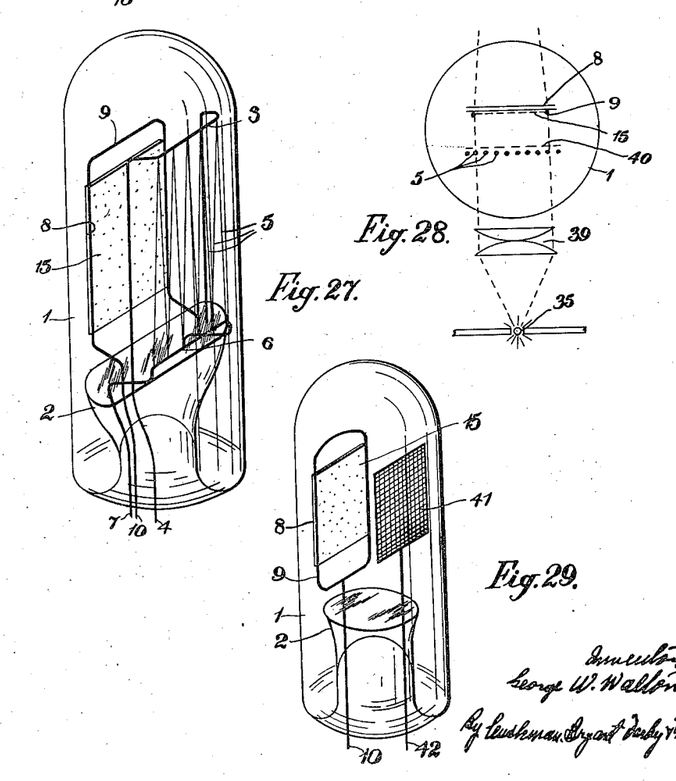
Fig. 29 illustrates a device in which use is made also of photoelectric emission.

In the vacuum devices hereinbefore described, the source of light was mounted within them, but this is not essential as it may be entirely separate. Such an arrangement is shown in Figs. 25 and 26. An external source of light 35 is focussed by means of a lens 39 on to or near the filament 5. The latter is of the dull emitting type and is bi-filar, as shown, the heat of the light from 35 heating the filament up to the temperature necessary to obtain electric emission, more particularly if 35 is an arc-lamp or an equivalent powerful light; alternatively the filament may be heated in the usual way. Fig. 26 shows the general arrangement and the paths of light. According to a modification, light from the source 35 may pass through 8 and 15 before it is focussed on 5. The filament 5 need not be bi-filar; on the other hand it may be more distributed, e. g. as shown in Figs. 27 and 28. The light from 35 is not focussed as in Figs. 25 and 26, the effect obtained being much the same as in the case of the construction according to Fig. 16.

Actually the filament is not sufficiently distributed in Fig. 27 but this may be overcome by arranging a screen 40 as shown in Fig. 28, such as a fine wire mesh and the like, to which a positive constant potential is applied relatively to the filament, whereby a more even distribution of the electrons from 5 to 15 is ensured.

In a further type of vacuum device, the effects hereinbefore described are obtained by making use of photo-electric emission. Such a device is shown in Fig. 29, in which the highly resistant film 15 is of a material which is photo-electrically active. Under the influence of light passing through the device, the film emits electrons which are collected by the anode 41, the latter being preferably in the form of a wire mesh or the like, and the connection therewith being made by means of a lead 42. A positive potential is applied to the anode 41 relatively to the film 15, the variations of which potential produce the effects above described. The anode 41 may be concentrated in a single wire, a small circle or even the point of a wire, according to the particular effect which it is desired to secure.

Figures 30, 31, 32, 33, 34:
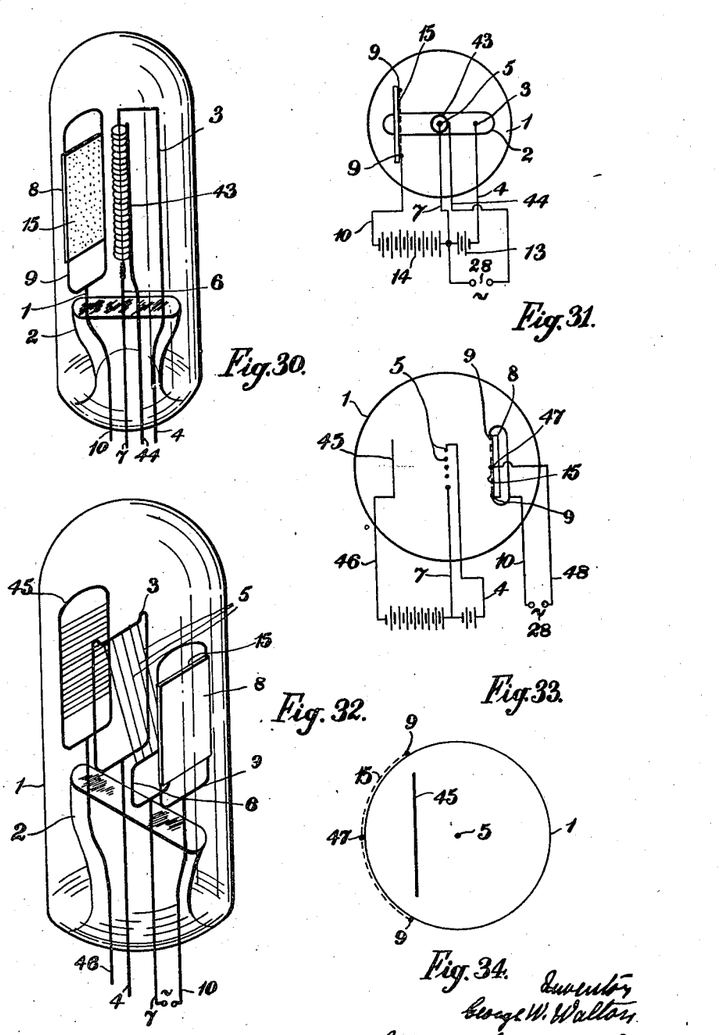
Figs. 30 and 31, 32, 33, and 34 illustrate different modifications in which use is also made of a control electrode.

The vacuum devices hereinbefore described have not been provided with control electrodes, but such electrodes may be used, as in ordinary thermionic devices. Figs. 30 and 31 show such a type, in which a control member 43 in the form of a grid is interposed between the filament 5 and the resistant film 15 which constitutes the anode. The connection with the grid 43 is made by means of a lead 44. In this case a constant positive potential is applied to the film 15 relatively to the filament 5, and a varying potential, such as television signals and the like, may be applied between 43 and 5. The voltage drop across the film 15 depends on the thermionic current, which in its turn depends on the potential of 43 relatively to 5, so that the optical effect of the device varies with the grid potential. In Fig. 31, which shows a section of the device and the circuits connected to it, 14 is a source of constant potential to be applied to the film 15, and 28 are the terminals to which is connected the source of varying potential to be applied to the grid 43.

The control member may be any of the types used in known thermionic devices. For instance, it may take the form of the screen 40 shown in Fig. 28, so that in that device there would be a second fine wire mesh between 40 and 15, or it may be on that side of the filament which is furthest away from the anode 15. The varying potential may be applied between the control member and the high resistant film, i. e. in Fig. 31, the terminals 28 would be connected to the leads 10 and 44 respectively, instead of as shown in that figure.

The high resistant film itself may also be the control member. This is shown in Fig. 32, 45 being the anode which is in the form of a screen of wires, and the resistant film 15 influencing the electrons which pass from the filament 5 to the anode 45, although the film 15 is not in the path. The operating varying potential is applied between the filament 5 and the film 15. Alternatively, the film 15 may have a centre connector 47 as well as two side connectors 9, as shown in Fig. 33, and the varying potential be applied between 47 and 9, as shown. In this case the action of the film 15 is similar to that in Fig. 21. The film may be applied outside of the vessel 1, e. g. deposited on its external surface as shown in Fig. 34, or on the opposite side, i. e. nearest to the filament 5, but in such a case it is preferable that the filament be distributed as shown in Figs. 27 and 28, and in Fig. 32.

The resistant film 15 of the devices hereinbefore described need not be of uniform resistance. In fact in some cases, when it is uneven, it affords a very ready means of correction of defects, peculiar to the device itself, as well as for optical aberrations of the normal type. For instance, when the device shown in Fig. 1 has a film of even resistance, it has a peculiar aberration, since it acts as two prisms, base to base, the point 16 in Fig. 3 being the junction of the bases; consequently the wave front in that figure would not be exactly cylindrical, but each half 16—9a would have a spiral curvature, the two halves being reversed relatively to each other. The amount of deviation from true cylindrical form is very small in practice, but it can be completely corrected if the resistant film varies in thickness, and therefore in resistance, from 16 to 9. This variation can be readily obtained during the formation of the film by sputtering. Similarly, in all other cases the film may be varied in thickness in order to obtain a desirable modification of the optical effect of the device. In the case of liquid or colloidal resistors as in Fig. 19, the compartment containing such a resistor would be so shaped as to obtain the desired variation of resistance, and consequently the desired potential at different parts of the resistor.

Most of the above devices have been described as giving cylindrical lens effects, but all of them may be constructed to give a spherical lens effect, by suitably arranging the resistant film connections and the other electrodes associated therewith, for instance as described in connection with Fig. 7.

It is to be understood that the invention is not limited to the examples hereinbefore given and that the details for carrying it into effect may be modified in various respects without in any way departing from the spirit of the invention.

What I claim as new and desire to secure by Letters Patent of the United States is:—

1. The method of producing a refractive effect upon light with the aid of an electrically stressed light transmitting medium disposed in the path of said light which comprises establishing in the direction of said path, an electrostatic stress having at least a component which is constant at any one point but differs from one point to another in a direction transverse to said path and passing a beam of light through said medium along said path.

2. The method of producing electrically the effect of a lens, with the aid of an electrically influenced light transmitting region disposed in a light path, which comprises establishing in said region an electrostatic influence which changes in magnitude progressively and in the same sense from the centre of said region to the boundaries thereof in a direction transversely of said path and passing a beam of light through said region along said path.

3. The method of producing electrically the effect of a lens, with the aid of an electrically stressed transparent region disposed in a light path, which comprises establishing in said region, in the direction of said path, an electrostatic stress the magnitude of which changes progressively, and in the same sense, from the centre of said region to the boundaries thereof in a direction transverse of said path and passing a beam of light through said region along said path.

4. The method of producing electrically the effect of a prism with the aid of an electrically stressed transparent region disposed in a light path, which comprises establishing in said region, in the direction of said path, an electrostatic stress the magnitude of which changes progressively from one boundary of said region to another in a direction transverse of said path and passing a beam of light through said region along said path.

5. Electro-optical apparatus comprising an electrode in the form of an electrically resistive film, a second electrode, a light transmitting medium between said electrodes, a relatively highly conducting region on said film, means for applying a potential difference between said second electrode and said highly conductive region, and means providing an electrical conducting path independent of said highly conducting region between said second electrode and said resistive film whereby the potential difference between said second electrode and said highly conductive region can be made substantially different from the potential difference between said second electrode and points on said resistive film.

6. Apparatus according to claim 5, wherein said film is adapted for the passage of light therethrough.

7. Electro-optical apparatus comprising an electrode in the form of an electrically resistive film, a second electrode, a light transmitting medium between said electrodes, a relatively highly conducting zone extending across said film substantially centrally thereof, means for applying a potential difference between said second electrode and said highly conducting zone, and means providing an electric conducting path independent of said highly conducting zone between said second electrode and said resistive film whereby the potential difference between said second electrode and said highly conductive zone can be made substantially different from the potential difference between said second electrode and points on said resistive film.

8. Electro-optical apparatus comprising an electrode in the form of an electrically conducting but resistive film, a second electrode, a light transmitting region between said electrodes, a relatively highly conducting zone extending substantially around said film, terminal means for applying a potential difference between said second electrode and said highly conducting zone, and means permitting a flow of current between said electrodes in response to a potential difference applied between said terminal means.

9. Electro-optical apparatus comprising an electrode in the form of an electrically conducting but resistive film, a second electrode, a light transmitting medium between said electrodes, a relatively highly conducting zone extending across said film upon a part of one side thereof, terminal means for applying a potential difference between said second electrode and said highly conducting zone, and means permitting a flow of current between said electrodes in response to a potential difference applied between said terminal means.

10. An electric discharge device adapted to produce a refractive optical effect upon light and comprising within an evacuated envelope a cathode capable of being heated to an electron emitting temperature, an anode adapted for the passage of light therethrough and having a region of relatively high conductivity and a region of relatively low conductivity, a light transmitting path between said anode and said cathode, and terminals outside said envelope connected to said cathode and said relatively highly conducting region.

11. An electric discharge device according to claim 10, wherein there is provided a third electrode positioned to control the intensity of the electron stream between said anode and cathode.

12. The method of producing a varying refractive optical effect upon light with the aid of an electrically stressed light transmitting medium disposed in the path of said light, which comprises establishing in said medium, an electrostatic field, the intensity of which is different at different parts of said medium in a direction transversely of said path, producing a variation of the intensity of the electrostatic field at all points of the electrostatic field simultaneously and passing a beam of light along said path.

13. The method of producing a refractive optical effect upon light with the aid of an electrically influenced light transmitting region disposed in the path of said light, which comprises establishing in said region an electrostatic field, the intensity of which has at least a component which is constant at any one point but different at different parts of said region in a direction transverse of said path.

14. Electro-optical apparatus adapted to produce a refractive optical effect, said apparatus comprising an evacuated envelope containing two electrodes and a light transmitting medium between said electrodes, one of said electrodes being capable of being heated to an electron emitting temperature and the other of said electrodes having a conductive but relatively highly resistive region and in electrical contact with said resistive region a relatively highly conductive region whereby a smoothly progressive change of potential can be established over said highly resistive region in response to a steady potential difference applied between said electrodes.

15. The method of varying the intensity of a beam of light in accordance with changes in electrical potential difference which comprises causing said beam to pass first through a transparent region which is subjected to electrical stress, the intensity of which differs from one point to another in a direction transverse of said path and then through an apertured member, and changing the potential difference to produce a change in the average intensity of said electrical stress, and thereby to vary in accordance with said potential difference the fraction of said beam which passes through said apertured member.

16. A method of producing a refractive optical effect upon light with the aid of a light transmitting medium and two electrodes for establishing an electric stress in said medium, one of said electrodes having a substantial electrical resistance in at least one direction, said method comprising the steps of passing light through said medium in a direction transverse of the first-named direction, applying an electrical potential difference between said electrodes to produce an electrostatic field having a component in the direction of said light and causing a current to flow in said first-named direction through the electrode having substantial resistance to produce a substantial potential gradient along this electrode in said first-named direction.

GEORGE WILLIAM WALTON.